United States Patent [19]

Usui

[11] Patent Number: 5,671,448

[45] Date of Patent: Sep. 23, 1997

[54] MOTION COMPENSATION DEVICE FOR SUPPRESSING IMAGE BLUR IN AN OPTICAL SYSTEM

[75] Inventor: Kazutoshi Usui, Kawasaki, Japan

[73] Assignee: Nikon Corporation, Tokyo, Japan

[21] Appl. No.: 491,575

[22] Filed: Jun. 16, 1995

[30] Foreign Application Priority Data

Jun. 16, 1994 [JP] Japan .................. 6-134068

[51] Int. Cl.$^6$ .......................... G03B 17/00
[52] U.S. Cl. .......................... 396/55; 396/52
[58] Field of Search .............. 291/70, 202, 430, 291/195.12; 396/52, 53, 54, 55, 13

[56] References Cited

U.S. PATENT DOCUMENTS

| | | | |
|---|---|---|---|
| 4,996,545 | 2/1991 | Enomoto et al. | 354/70 |
| 5,012,347 | 4/1991 | Fournier | 354/70 |
| 5,084,724 | 1/1992 | Maeno | 354/430 |
| 5,153,633 | 10/1992 | Otani | 354/430 |
| 5,181,056 | 1/1993 | Noguchi et al. | 354/70 |
| 5,266,988 | 11/1993 | Washisu | 354/70 |
| 5,416,558 | 5/1995 | Katayama et al. | 354/430 |

*Primary Examiner*—Safet Metjahic
*Assistant Examiner*—Nicholas T. Tuccillo

[57] ABSTRACT

An image blur suppression device for suppressing blur caused by motions imparted to a main optical system. A motion compensation optical system is supported by an elastic supporting material that permits the motion compensation optical system to shift perpendicular to an optical axis of the main optical system. A magnet is fixed to a stationary member surrounding the motion compensation optical system. A coil is linked to the motion compensation optical system. By supplying electrical current to the coil, an electromagnetic force is created which moves the motion compensation optical system. The magnet possesses two poles aligned in the direction of movement of the motion compensation optical system. The coil is wound in the direction approximately parallel to the optical axis of the main optical system.

16 Claims, 6 Drawing Sheets

MOTION COMPENSATION DEVICE FOR SUPPRESSING IMAGE BLUR IN AN OPTICAL SYSTEM

BACKGROUND OF THE INVENTION

1. Field of the Invention

The present invention relates to an image blur suppression device, and in particular, relates to a motion compensation device for suppressing image blur in an optical system.

2. Description of the Related Art

Image blur suppression devices have as their object, suppression of, or reduction of, blurring in an image projected onto an image plane. A motion compensation device is a type of image blur suppression device which compensates for motion incident upon an optical system which projects the image onto the image plane. Motion is typically imparted to the optical system by way of vibrations in the optical system, or in the surrounding holding member. In general, known motion compensation devices cause a compensation lens to shift counter to the motion of the optical system so as to shift the image projected by the optical system relative to the optical system.

FIG. 4 is a perspective view of a known motion compensation device disclosed in the Japanese Patent Journal, entry number TOKU-KAI-HEI-66536. A lens retainer 3 holds a compensation lens 2. Four support rods 4, formed of a bendable material, extend between four gaps of the lens retainer 3 and a rear face of a main body 1 of a camera. In this way, the support rods 4 support the lens retainer 3 in the manner of a cantilever.

FIG. 5 is a side cut-away view of the known motion compensation device as shown in FIG. 4. The support rods 4 are composed of a metal core material of phosphor bronze $4a$ covered with a flexible material $14b$, such as rubber. Both ends of the metal core $4a$ extend past both ends of the flexible material $4b$ and are fixed by a set of screws 15 to the lens retainer 3. A set of screws 16 connect the metal cores $4a$ to the main body of the camera 1. The screws 15 and 16 may also be fixed with solder or some other method. The screws 15 and 16 and the support rods 4 are positioned parallel to the optical axis of the compensation lens 2, and, in addition, are all equal in length. The lens retainer 3 is able to move approximately perpendicular to the optical axis via the bending of the support rods 4. FIG. 6 is a side cut-away view of the known motion compensation device as shown in FIG. 5, wherein the lens retainer 3 has been moved.

Referring once again to FIG. 4, a pair of coils 6 and 8 are fixed to cut out areas in the sides of the lens retainer 3. A pair of yokes 5 and 7 are fixed as cantilevers to the main body 1 of the camera. The yokes 5 and 7, are paired with the coils 6 and 8, to form two electromagnetic actuators.

FIG. 7 is a side cut-away view of the yoke 5 in the known motion compensation device as shown in FIG. 4. Three protrusions $5a$–$c$ are provided on the end of the yoke 5. The coil 6 is inserted over the center protrusion $5c$. The protrusions $5a$ and $5b$ are located on opposite sides of protrusion $5c$. A pair of magnets $5d$ and $5e$ are respectively fixed to the inner faces of the protrusions $5b$ and $5a$. The yoke 5 and the magnets $5d$ and $5e$ comprise a stator of the actuator, which is used to move the lens retainer 3 in the Y-axis direction, while coil 6 acts as the moving part of the actuator. In other words, a so-called "moving coil" construction is used.

Referring once again to FIG. 4, a pair of position sensors 22 and 23, fixed to the lens retainer 3, detect the position of the lens retainer 3. When the lens retainer 3 moves in the direction of the Y-axis, the position sensor 23 emits a signal that represents the position of the lens retainer 3 along the Y-axis. Similarly, when the lens retainer 3 moves in the direction of the X axis, the position sensor 22 emits a signal that represents the position of the lens retainer 3 along the X-axis. A pair of motion detection members 18 and 19 detect the angular velocity of the camera around the X and Y axes, respectively.

FIG. 8 is a block diagram of the known motion compensation device as shown in FIG. 4. When an angular motion is produced in the camera around the X-axis, an output voltage is produced in response to the direction and degree of the motion of the camera by the motion detection member 18. The output voltage output by the motion detection member 18 is input into a motion compensation circuit 20. The motion compensation circuit 20 receives the output from motion detection member 18, computes an electrical current value for the coil 6 and supplies that electrical current to the coil 6. When the coil 6 is supplied with a current, the coil 6 and the lens retainer 3 are moved in a direction along the Y-axis by the electromagnetic force caused between the coil 6 and the yoke 5. When the lens retainer 3 is moved along the Y-axis, a signal relating its position on the Y-axis is emitted from the Y-axis direction position sensor 23. This signal is input as a feedback signal to the motion compensation circuit 20. The motion compensation circuit 20 then computes the compensation amount, in relation to the difference between the output of the motion detection member 18 and the output of the Y-axis direction position sensor 23, and controls the position of the motion compensation lens 2 through the supply of electrical current relative to the computation result. In addition, when the camera becomes subject to a motion around the Y-axis, control similar to the above is effected by the motion detection member 18, the motion compensation circuit 21, the coil 8, and the position sensor 22.

However, the electromagnetic actuators, formed with the yokes 5 and 7 and the magnets $5d$, $5e$, $7d$, and $7e$, for example, see FIG. 7 showing a side view of yoke 5 and magnets $7d$ and $7e$, increase the profile of the motion compensation device in the direction of the optical axis. Because the position sensors 22 and 23 are attached to the lens retainer 3, the weight of the moveable component is unnecessarily large. Further, it is expensive to attach the yokes 5 and 7 to the camera main body 1 with screws. Also, when the lens retainer 3 is caused to move a large distance, the motion compensation device is damaged due to the contact between the yokes 5 and 7 and the coils 6 and 8. Additionally, the lead wires used to conduct the electrical signal from position sensors 22 and 23 impeded the movement of the moveable component.

SUMMARY OF THE INVENTION

Accordingly, it is an object of the present invention to provide a motion compensation device that has a reduced profile along the optical axis of a motion compensation lens.

It is another object of the present invention to provide a motion compensation device that has reduced assembly cost.

It is another object of the present invention to provide a motion compensation device that eliminates the danger of contact between a yoke and a coil of an actuation mechanism.

It is yet another object of the present invention to provide a motion compensation device that has a lighter moveable component and eliminates the limitations on the movement of the moveable component.

Additional objects and advantages of the invention will be set forth in part in the description which follows, and, in part, will be obvious from the description, or may be learned by practice of the invention.

Objects of the present invention are achieved in a motion compensation device comprising a motion compensation optical system having an optical axis, a magnet, a lower panel, a plurality of elastic support rods extending between the motion compensation optical system and the lower panel, the elastic support rods allowing the motion compensation optical system to move approximately perpendicular to the optical axis of the motion compensation optical system, and a coil adapted to move the motion compensation optical system approximately perpendicular to the optical axis of the motion compensation optical system by forming a magnetic circuit with the magnet.

Objects of the present invention are also achieved in a motion compensation device comprising a motion compensation optical system having an optical axis, a lower panel, a first magnet positioned on an X-axis, a second magnet positioned on a Y-axis, a plurality of elastic support rods extending between the motion compensation optical system and the lower panel, the elastic support rods allowing the motion compensation optical system to move approximately perpendicular to the optical axis of the motion compensation optical system, a first coil adapted to move the motion compensation optical system approximately parallel to the X-axis and approximately perpendicular to the optical axis of the motion compensation optical system by forming a magnetic circuit with the first magnet, and a second coil adapted to move the motion compensation optical system approximately parallel to the Y-axis and approximately perpendicular to the optical axis of the motion compensation optical system by forming a magnetic circuit with the second magnet.

Objects of the present invention are further achieved in a motion compensation device for suppressing blur in an image produced by a main optical system, the motion compensation device comprising a motion compensation optical system having an optical axis, a lower panel, a magnet having two poles aligned perpendicular to the optical axis of the motion compensation optical system, a plurality of elastic support rods extending between the motion compensation optical system and the lower panel, the elastic support rods allowing the motion compensation optical system to move approximately perpendicular to the optical axis of the motion compensation optical system, and a coil, wound approximately parallel to the optical axis of said motion compensation optical system, the coil being adapted to move the motion compensation optical system approximately perpendicular to the optical axis of the motion compensation optical system by forming a magnetic circuit with the magnet.

Objects of the present invention are also achieved in a motion compensation device comprising a main optical system having an optical axis, a motion compensation optical system that suppresses blur, flexible support material supporting the motion compensation optical system which allows movement approximately perpendicular to the optical axis of the main optical system, a plurality of magnets fixed on a stationary member, coils linked to the motion compensation optical system, and a drive producing member producing an electromagnetic force to move the motion compensation optical system, the drive producing member having a magnet possessing two poles aligned in the direction of movement of the motion compensation optical system, the drive producing member having a coil wound in the direction approximately parallel to the optical axis.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENT

Figure 1A:
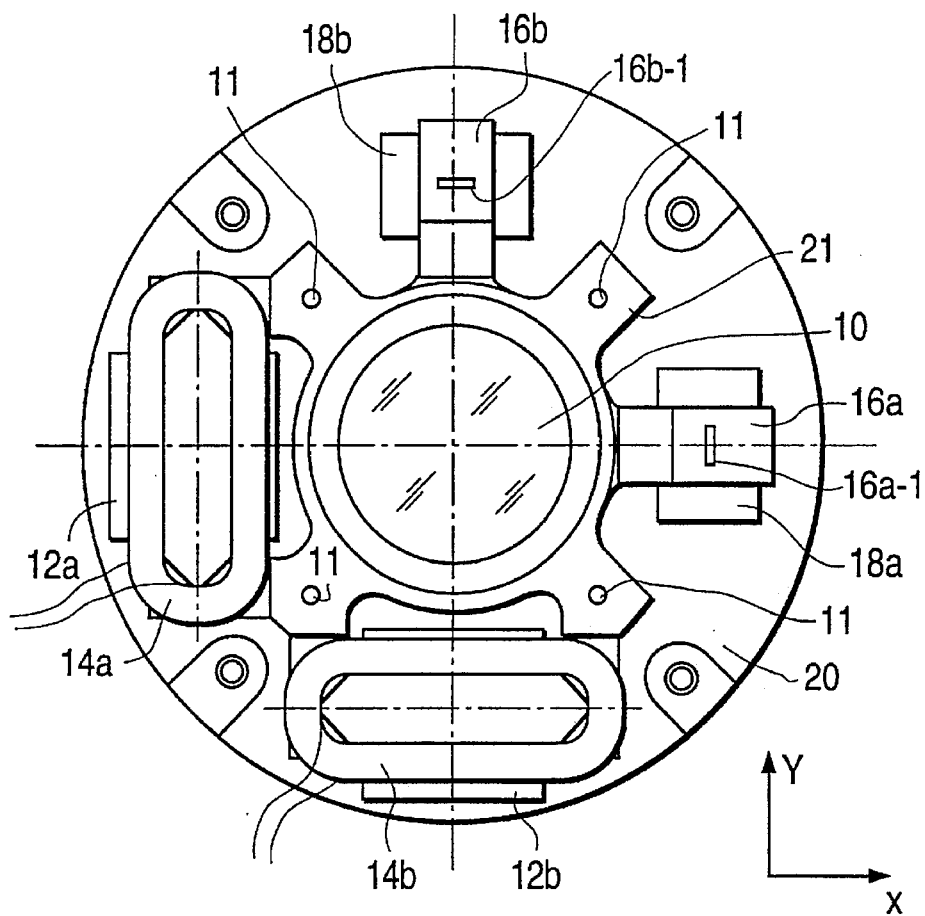
FIG. 1(A) is a front view of a motion compensation device in accordance with a preferred embodiment of the present invention.

Reference will now be made in detail to the present preferred embodiments of the present invention, examples of which are illustrated in the accompanying drawings, wherein like reference numerals refer to like elements throughout.

FIG. 1(A) is a front view of a motion compensation device in accordance with a preferred embodiment of the present invention. A lens tube 21 holds a motion compensation lens 10. The lens tube 21 is supported above a lower panel 20 on the ends of four elastic support rods 11 of equal length. The four elastic support rods 11 act as cantilevers. A pair of magnets 12a and 12b are respectively provided on the X and Y-axis of the motion compensation lens. A pair of coils 14a and 14b are provided in the vicinity of the magnets 12a and 12b, respectively. The operation of the magnets 12a and 12b in conjunction with the coils 14a and 14b will be described hereinafter. A pair of detection shields 16a and 16b are attached to the lens tube 21. Each detection shield 16a and 16b is provided with an elongated slit 16a-1 and 16b-1. A position sensitive diode ("PSD") 18a is located under the detection shield 16a, while a PSD 18b is located under the detection shield 16b. The PSDs 18a and 18b receive light passing through the slits 16a-1 and 16b-1, respectively. Generally, PSDs output two related signals from which a position is calculated.

Figure 1B:
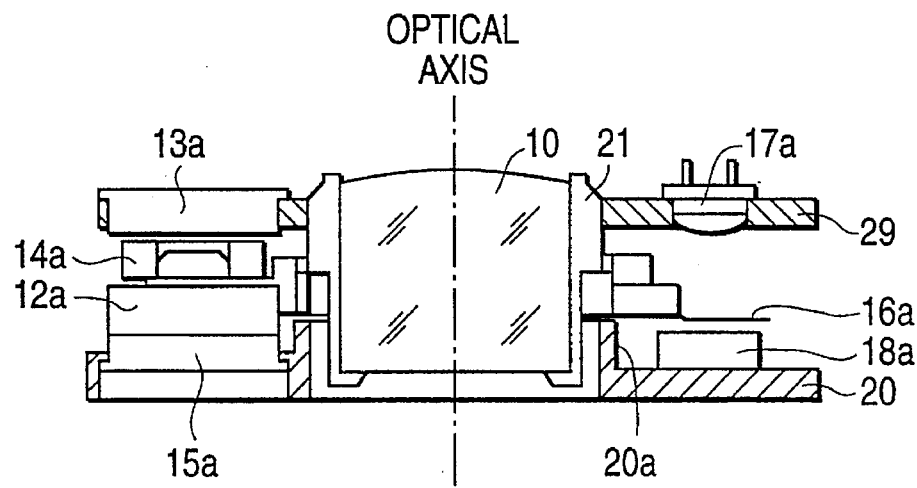
FIG. 1(B) is a side view of the motion compensation device in accordance with a preferred embodiment of the present invention.

FIG. 1(B) is a side view of the motion compensation device in accordance with a preferred embodiment of the present invention. A movement limiting flange 20a depends from the lower panel 20 and extends around the lens tube 21. The lower end of the lens tube 21 is located within the movement limiting flange 20a. When the lens tube 21 is moved to a great degree, the lens tube 21 comes in contact with the movement limiting area 20a, and the movement of the lens tube 21 is restricted. When a movement having a large acceleration is applied to the motion compensation device, the movement limiting flange 20a prevents an excessive load from being applied to the support rods 11. This prevents the support rods 11 from being broken during periods of excessive acceleration.

A pair of LEDs (only one LED 17a is shown in FIG. 1(B)) are attached to a fixed upper panel 29. The LEDs, preferably infra-red, act as light emitting elements. The pair of PSDs 18a and 18b (only one PSD 18a is shown in FIG. 1(B)) are attached to the lower panel 20 and act as light receiving elements. Furthermore, silicon photo diodes ("SPDs"), which output a single signal directly indicating position, can be used in place of PSDs. However, although SPDs have the advantage of a lower cost, their output is easily changed by the effects of outside random light, so care must be taken to prevent light leakage. The detection shield 16a is located between the LED 17a and PSD 18a. Similarly, the detection shield 16b (not shown in FIG. 1(B)) is located between an LED and the PSD 18(b) (not shown in FIG. 1(B)). For example, the light emitted from the LED 17a passes through the elongated slit 16a-1, and is received by PSD 18a. Thus, the movement of elongated slit 16a-1, via the movement of the motion compensation lens 10, is measured by the PSD 18, and translated into an electrical current.

The elongated slits 16a-1 and 16b-1 are, respectively, open elongated slits in the Y-axis and X-axis direction. The elongated slits 16a-1 and 16b-1 are linked to the motion compensation lens 10, and move approximately perpendicular to the optical axis, together with the motion compensation lens 10. Thus, for example, the elongated slit 16a-1 moves not only in the direction of the X-axis, but also in the direction of the Y-axis. It is necessary to make sure the detection value for the X-axis direction movement is not changed by the Y-axis direction movement. Therefore, the length of the elongated slit 16a-1 in the direction of the Y-axis must be made longer than possible movement along the Y-axis so that the detection value does not change due to Y-axis direction movement. The same is true for the elongated slit 16b-1.

As the LEDs 17 and PSDs 18a and 18b are attached to the fixed upper panel 29 and the lower panel 20, the weight of the lens tube 21 is reduced. This reduces the driving force required to move the motion compensation lens 10. Also, the PSDs 18a and 18b are not attached to the lens tube 21, thereby eliminating the need for a clumsy lead wire depending from the lens tube 21. This has the side effect of reducing the noise emanating from the motion compensation device.

A magnet 12a has two magnetic poles. The magnet 12a is attached approximately perpendicular to the optical axis of the motion compensation lens 10. The coil 14a, wound in a direction approximately parallel to the optical axis, is located in the vicinity of the magnet 12a. A yoke 13a, attached to the fixed upper panel 29, is located near the coil 14a opposite to the magnet 12a. A yoke 15a is attached to the magnet 12a. The yokes 13a and 15a are preferably made of steel. The yoke 13a is not attached with adhesive or screws, but rather, is held in place by the magnetic force of the magnet 12a. Normally, the yoke 13a will not be loosened when undergoing a normal degree of accelerated movements in handling the camera. The yoke 15a is also held in place next to a lower panel 20 by the magnetic force of the magnet 12a.

Figure 2:
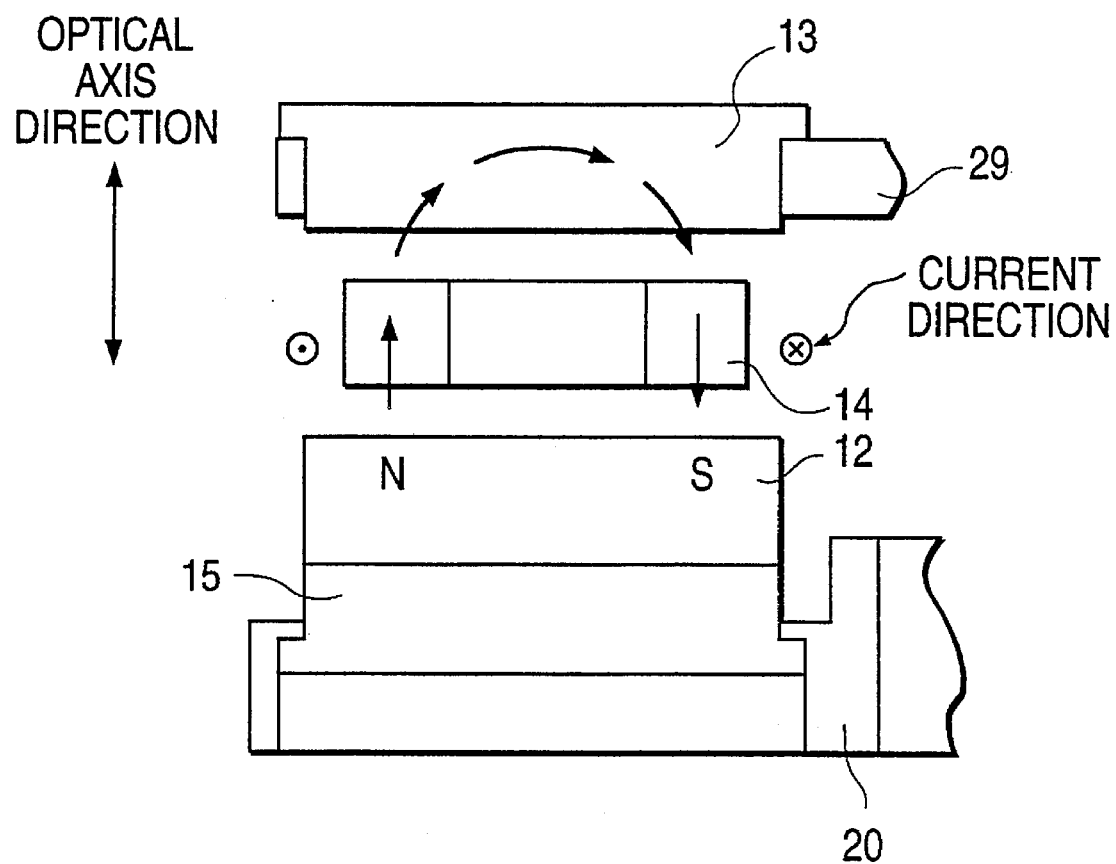
FIG. 2 is a diagram showing the operation of the motion compensation device in accordance with a preferred embodiment of the present invention.

FIG. 2 is a diagram showing an electromagnetic actuator for the motion compensation device in accordance with a preferred embodiment of the present invention. A magnetic circuit is formed having lines of magnetic force in the directions shown by arrows. The magnetic circuit generally comprises the magnet 12, the coil 14, and the yokes 13 and 15. If electrical current is applied to the coil 14, in accordance with Fleming's left hand rule, an electromagnetic force is produced perpendicular to the direction in which the electrical current flows and to the line of magnetic force. Thus, referring to FIG. 1(A), a force is produced along the X-axis when electricity passes through coil 14a. In the same manner, a force is produced along the Y-axis when electricity passes through the coil 14b. As the components in the direction of the optical axis are reduced to one magnet and one yoke, the thickness of the motion compensation device is reduced in the direction of the optical axis.

Figure 3A:
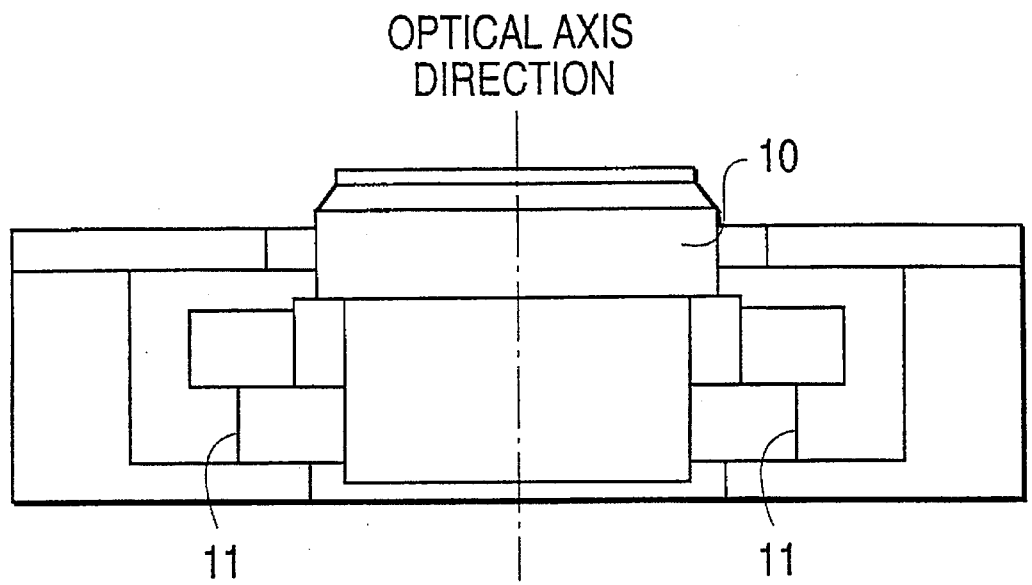
FIG. 3(A) is a top view of a lens tube having a motion compensation device in accordance with a preferred embodiment of the present invention.
Figure 3B:
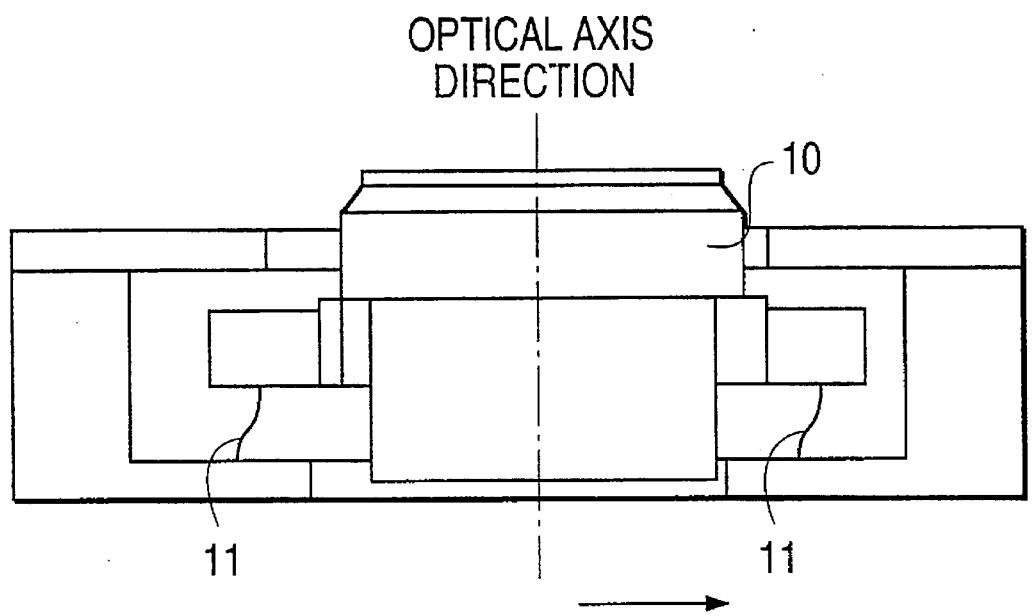
FIG. 3(B) is a top view of a lens tube having a motion compensation device in accordance with a preferred embodiment of the present invention.
Figure 4:
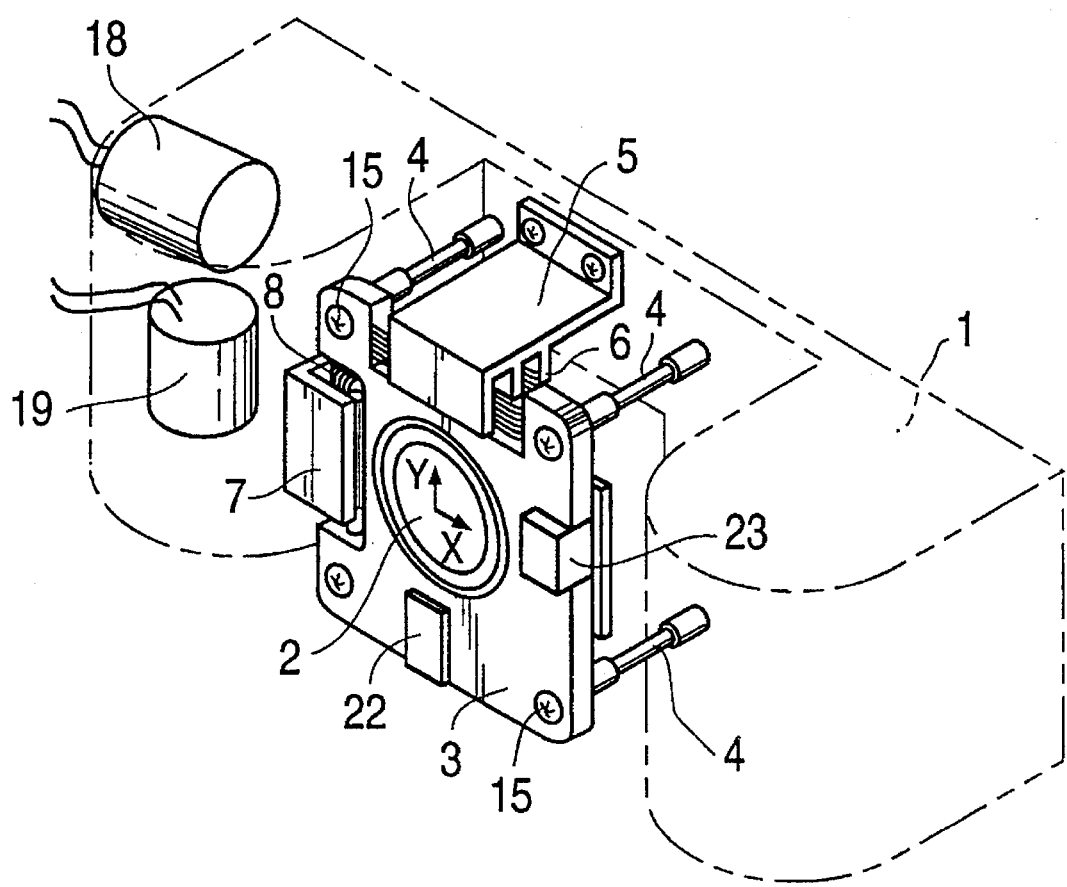
FIG. 4 is a perspective view of a known motion compensation device.
Figure 5:
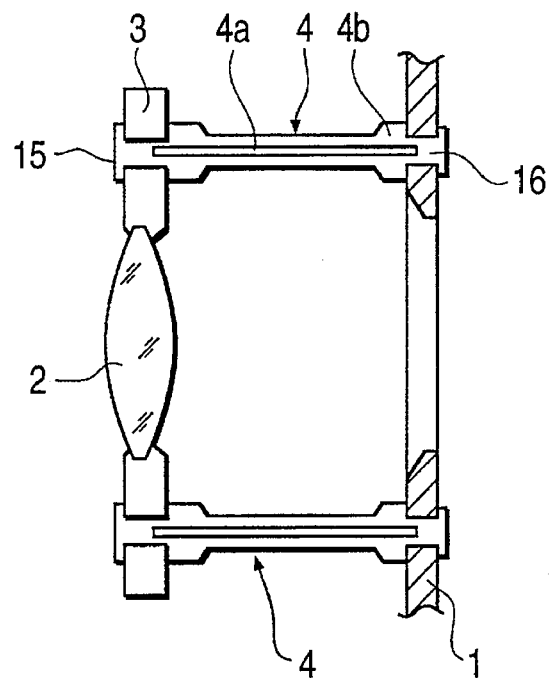
FIG. 5 is a side cut-away view of the known motion compensation device as shown in FIG. 4.
Figure 6:
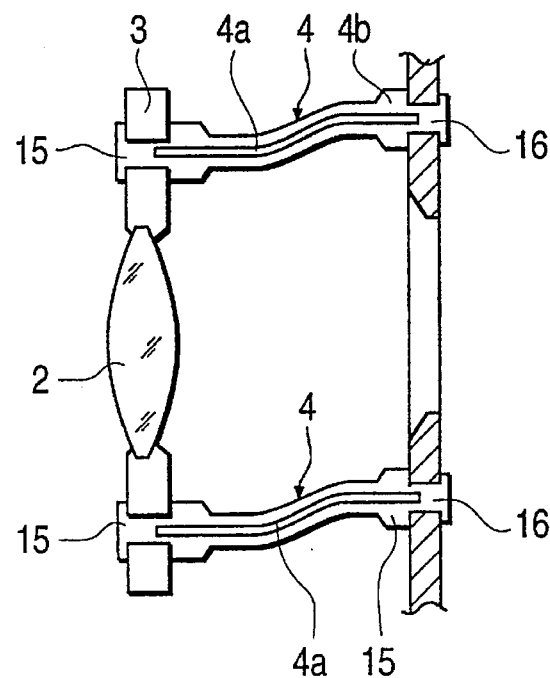
FIG. 6 is a side cut-away view of the known motion compensation device as shown in FIG. 5 wherein the lens retainer has been moved.
Figure 7:
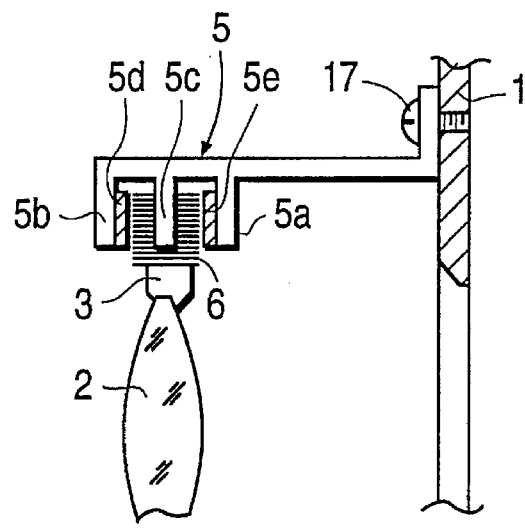
FIG. 7 is a side cut-away view of the yoke 5 in the known motion compensation device as shown in FIG. 4.
Figure 8:
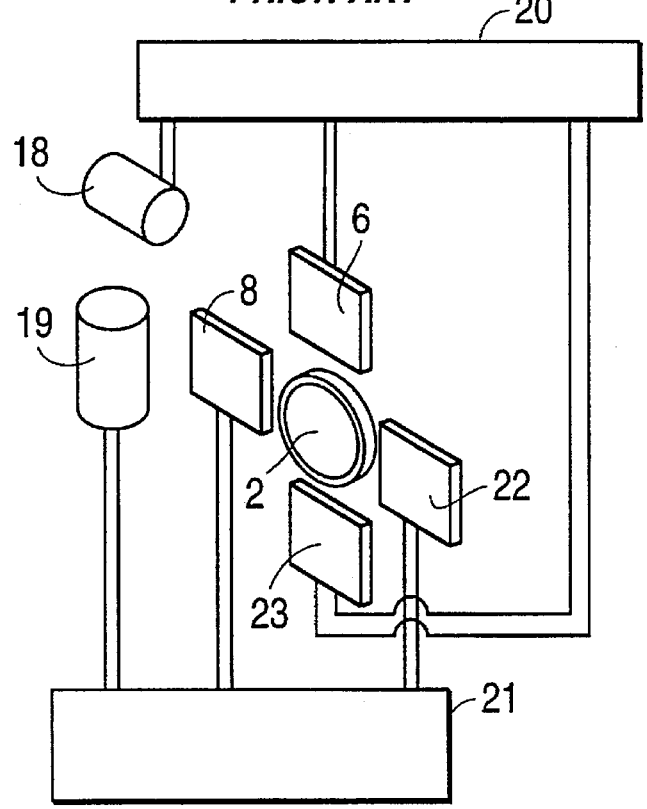
FIG. 8 is a block diagram of the known motion compensation device as shown in FIG. 4.

FIG. 3(A) is a top view of a lens tube having a motion compensation device in accordance with a preferred embodiment of the present invention. FIG. 3(B) is a top view of a lens tube having a motion compensation device in accordance with a preferred embodiment of the present invention. As shown in FIG. 3(B), the lens tube 21 can move in a direction approximately perpendicular to the optical axis when the elastic support rods 11 deform elastically.

Although the first embodiment of the present invention has been described with respect to a specific configuration, it will be recognized that the first embodiment is not limited to the specific configuration. For example, although the first embodiment has been described with respect to the use of a PSD as a light receiving element, but, for example, an SPD can also be used. Also, although the first embodiment has been described with respect to the use of the yoke 13, a magnetic circuit can be created without the yoke 13.

Although a preferred embodiment of the present invention have been shown and described, it would be appreciated by those skilled in the art that changes may be made in these embodiments without departing from the principles and spirit of the invention, the scope of which is defined in the claims and their equivalents.

In accordance with the preferred embodiment, the thickness and weight of the motion compensation device is reduced. Further, because a magnetic force is used to fix the yokes in place, the motion compensation device is easy to assemble, thereby reducing production costs. Also, because the motion compensation optical system comes in contact with a movement amount limiting flange prior to overextension, breakage of the supporting materials, etc. of the motion compensation device is eliminated. In addition, because the detection slits are elongated it is possible to stabilize the output from the light receiving element, thereby increasing the dependability of the motion compensation device.

What is claimed is:

1. A motion compensation device comprising:

a motion compensation optical system having an optical axis;

a fixed upper panel;

a lower panel;

a magnet positioned between said fixed upper panel and said lower panel;

a first yoke biased against said fixed upper panel by the magnetic force of said magnet;

a second yoke biased against said lower panel by the magnetic force of said magnet;

a plurality of elastic support rods extending between said motion compensation optical system and said lower panel, said elastic support rods allowing said motion compensation optical system to move approximately perpendicular to the optical axis of said motion compensation optical system; and a coil connected to said motion compensation optical system and adapted to move the motion compensation optical system approximately perpendicular to the optical axis of said motion compensation optical system by forming a magnetic circuit with said magnet and said first yoke and said second yoke.

2. A motion compensation device, as set forth in claim 1, wherein the magnet has two poles aligned perpendicular to the optical axis of said motion compensation optical system.

3. A motion compensation device, as set forth in claim 1, wherein the coil is wound approximately parallel to the optical axis of said motion compensation optical system.

4. A motion compensation device, as set forth in claim 1, wherein the lower panel is provided with an opening having a limiter which surrounds said motion compensation optical system, the limiter being adapted to restrict the movement of said motion compensation optical system.

5. A motion compensation device, as set forth in claim 1, further comprising:

a fixed upper panel surrounding said motion compensation optical system;

a light emitting element attached to said fixed upper panel;

a silicon photo diode attached to said lower panel in line with said light emitting element; and a detection shield fixed to said motion compensation optical system so as to extend between said light emitting element and said silicon photo diode.

6. A motion compensation device, as set forth in claim 1, further comprising:

a fixed upper panel surrounding said motion compensation optical system;

a light emitting element attached to said fixed upper panel;

a position sensitive device attached to said lower panel in line with said light emitting element; and a detection shield having an opening, said detection shield being fixed to said motion compensation optical system so as to extend between said light emitting element and said position sensitive device.

7. A motion compensation device, as set forth in claim 6, wherein the opening in said detection shield is elongated perpendicular to the optical axis of said motion compensation optical system.

8. A motion compensation device, as set forth in claim 6, wherein said light emitting element is an LED.

9. A motion compensation device comprising:

a motion compensation optical system having an optical axis;

a fixed upper panel;

a lower panel;

a first magnet positioned on an X-axis between said fixed upper panel and said lower panel;

a second magnet positioned on a Y-axis between said fixed upper panel and said lower panel;

a first and third yoke biased against said fixed upper panel by said first and second magnets, respectively;

a second and forth yoke biased against said lower panel by said third and forth magnets, respectively;

a plurality of elastic support rods extending between said motion compensation optical system and said lower panel, said elastic support rods allowing said motion compensation optical system to move approximately perpendicular to the optical axis of said motion compensation optical system;

a first coil connected to said motion compensation optical system and adapted to move the motion compensation optical system approximately parallel to the X-axis and approximately perpendicular to the optical axis of said motion compensation optical system by forming a magnetic circuit with said first magnet and said first and second yoke; and a second coil connected to said motion compensation optical system and attached to said motion compensation optical system on the Y-axis, said coil being adapted to move the motion compensation optical system approximately parallel to the Y-axis and approximately perpendicular to the optical axis of said motion compensation optical system by forming a magnetic circuit with said second magnet and said third and fourth yoke.

10. A motion compensation device, as set forth in claim 9, wherein the first magnet has two poles aligned along the Y-axis, and the second magnet has two poles aligned along the X-axis.

11. A motion compensation device as set forth in claim 9, wherein the first and second coils are wound approximately parallel to the optical axis of said motion compensation optical system.

12. A motion compensation device for suppressing blur in an image produced by a main optical system, the motion compensation device comprising:

a motion compensation optical system having an optical axis;

a fixed upper panel;

a lower panel;

a magnet having two poles aligned perpendicular to the optical axis of said motion compensation optical system, said magnet being positioned between said fixed upper panel and said lower panel;

a first yoke biased against said fixed upper panel by the magnetic force of said magnet;

a second yoke biased against said lower panel by the magnetic force of said magnet;

a plurality of elastic support rods extending between said motion compensation optical system and said lower panel, said elastic support rods allowing said motion compensation optical system to move approximately perpendicular to the optical axis of said motion compensation optical system; and a coil, wound approximately parallel to the optical axis of said motion compensation optical system, said coil being adapted to move the motion compensation optical system approximately perpendicular to the optical axis of said motion compensation optical system by forming a magnetic circuit with said magnet and said first and second yoke.

13. A motion compensation device as set forth in claim 12, wherein said motion compensation optical system is moved opposite the direction of motion of the main optical system.

14. A motion compensation device as set forth in claim 12, wherein the main optical system is contained within a camcorder.

15. A motion compensation device as set forth in claim 12, wherein the main optical system is contained within a photographic camera.

16. A motion compensation device as set forth in claim 15, further comprising:

a fixed upper panel surrounding said motion compensation optical system;

a light emitting element attached to said fixed upper panel;

a position sensitive device attached to said lower panel in line with said light emitting element; and a detection shield having an opening, said detection shield being fixed to said motion compensation optical system so as to extend between said light emitting element and said position sensitive device.

* * * * *